Patented Dec. 23, 1952

2,623,041

UNITED STATES PATENT OFFICE 2,623,041

PREPARATION OF ACID-SOLUBLE CELLULOSE DERIVATIVES

Vernon R. Grassie, Wilmington, Del., assignor to Hercules Powder Company, Wilmington, Del., a corporation of Delaware No Drawing. Application December 23, 1949, Serial No. 134,846

12 Claims. (Cl. 260—231)

This invention relates to the preparation of dialkylaminoalkyl ethers of cellulosic compounds and, more particularly, to a process of reacting dialkylaminoalkyl halides with cellulose or partially substituted celluloses whereby a highly substituted and acid-soluble dialkylaminoalkyl cellulose derivative is obtained.

Many attempts have been made in the past to produce nitrogen-containing cellulose derivatives which would be acid soluble. One of the earliest suggestions for preparing such products was the reaction of alkali cellulose with a halogen alkylamine. However, the products obtained by this process were of only a very low degree of substitution and were not acid soluble. Attempts have also been made to react a halogen-containing cellulose derivative with ammonia or an amine, but in neither case were the products acid soluble. More recently, it has been suggested that amino derivatives could be prepared by reacting an alkali metal cellulosate, prepared by treating cellulose with an alkali metal in liquid ammonia, with a monohalogen amine, but again only a low degree of substitution was obtained and the reaction was a difficult and inefficient one.

Now in accordance with this invention it has been found that a cellulosic compound containing etherifiable hydroxyl groups, that is, cellulose or a partially substituted cellulose, may be reacted with dialkylaminoalkyl halides in the presence of a quaternary ammonium hydroxide to produce an acid-soluble highly substituted dialkylaminoalkyl ether.

The following examples will illustrate the preparation of dialkylaminoalkyl ethers of cellulose and partially substituted celluloses in accordance with this invention. All parts and percentages are by weight unless otherwise indicated.

Example 1

Two parts of cotton linters were dissolved in 80 parts of a 40% aqueous solution of trimethylbenzyl ammonium hydroxide (15.4 moles per anhydroglucose unit) by agitating the mixture for ½ hour at room temperature. Dimethylaminoethyl bromide hydrobromide (9.66 parts, which was equivalent to 3.0 moles per anhydroglucose unit) was then added and the reaction solution was stirred for 5 hours at 40° C. The product was precipitated by the addition of a 7:3 mixture of acetone and methanol and the finely-divided white granules were separated by filtration, washed with the acetone-methanol mixture, then with acetone, and finally were dried at 50° C. in vacuo. The diethylaminoethyl cellulose so obtained amounted to 2.80 parts and had a nitrogen analysis of 4.12, indicating a degree of substitution of 0.67 diethylaminoethyl group per anhydroglucose unit. The diethylaminoethyl cellulose was completely soluble in water, aqueous alkali, and aqueous acids including both acetic and inorganic acids. It was extensively soluble in methanol and somewhat solvated by ethanol.

Example 2

Example 1 was repeated except that high-alpha purified wood pulp was used in place of the cotton linters and the etherifying agent was diethylaminoethyl chloride hydrochloride (6.37 parts or 3 moles per anhydroglucose unit). The diethylaminoethyl cellulose so obtained amounted to 2.89 parts and contained 4.08% nitrogen, which was equivalent to a degree of substitution of 0.66 diethylaminoethyl group per anhydroglucose unit. The product had the same solubility characteristics as that obtained in Example 1.

Example 3

Example 1 was repeated except that 5 moles of diethylaminoethyl bromide hydrobromide per anhydroglucose unit (16.1 parts) were used. The white powder so obtained amounted to 2.50 parts and contained 4.58% of nitrogen, which was equivalent to a degree of substitution of 0.78 diethylaminoethyl groups per anhydroglucose unit. This diethylaminoethyl cellulose was soluble in water, aqueous alkali, and aqueous acids, as was the product of Example 1, but it was more extensively solvated by alcohols than was that product.

Example 4

Two parts of cotton linters were dissolved in 75 parts of a 40% aqueous solution of dimethyl dibenzyl ammonium hydroxide (10 moles per anhydroglucose unit) by stirring the mixture for one hour at room temperature. Dimethylaminoethyl chloride hydrochloride (5.34 parts, which was equal to 3 moles per anhydroglucose unit) was then added and the mixture was agitated for 6 hours at 40° C. The product was precipitated, washed, and dried as described in Example 1. The dimethylaminoethyl cellulose so obtained amounted to 2.50 parts and contained 4.10% of nitrogen, which indicated a degree of substitution of 0.60 of dimethylaminoethyl groups per anhydroglucose unit. This product was readily soluble in water, aqueous alkali, and aqueous acid, but was practically unaffected by methanol.

*Example 5*

Three parts of the sodium salt of a carboxyethyl cellulose having a degree of substitution of 0.43 (base weight of 203) were dissolved in 93 parts of a 40% aqueous solution of trimethylbenzyl ammonium hydroxide (15 moles per base weight) and the temperature of the solution was adjusted to 35°–40° C. Diethylaminoethyl bromide hydrobromide (15.4 parts, which was equivalent to 4 moles per base weight) was then added and the reaction continued at that temperature for 4 hours. The product was precipitated by adding a 7:3 mixture of acetone and methanol, separated by filtration, washed with the mixed solvent, and then with acetone, and was finally dried at 50° C. in vacuo. The carboxyethyl diethylaminoethyl cellulose so obtained amounted to 4.00 parts and contained 3.51% nitrogen, which indicated a dimethylaminoethyl substitution of 0.70. This product was completely soluble in water, 10% hydrochloric acid, 20% acetic acid, and 5% sodium hydroxide. It dissolves in methanol to form a thixotropic solution.

*Example 6*

Three parts of the sodium salt of a sulfoethyl cellulose having a degree of substitution of 0.32 (base weight of 204) were dissolved in 92 parts of a 40% aqueous solution of trimethylbenzyl ammonium hydroxide (15 moles per base weight). Diethylaminoethyl bromide hydrobromide (15.4 parts, which was equivalent to 4 moles per base weight) was added and the reaction mixture heated to 35°–40° C. for 4 hours. The product was precipitated, washed, and dried, as described in the foregoing examples. The product so obtained contained 3.60% nitrogen and 3.1% sulfur, which corresponds to a diethylaminoethyl substitution of 0.70 and a sulfoethyl substitution of 0.25. The sulfoethyl diethylaminoethyl cellulose was completely soluble in water, dilute acids, and dilute alkali. It dissolves in methanol to form a thixotropic solution.

*Example 7*

Three parts of a hydroxyethyl cellulose having a degree of substitution of 1.91 (base weight of 246) were dissolved in 74 parts of a 40% aqueous solution of trimethylbenzyl ammonium hydroxide (15 moles per base weight). Diethylaminoethyl bromide hydrobromide (12.7 parts, which was equivalent to 4 moles per base weight) was then added and the solution was heated to 40° C. for 4 hours. The product was precipitated, washed, and dried, as described in the foregoing examples. The hydroxyethyl diethylaminoethyl cellulose so obtained amounted to 2.91 parts and contained 3.21% of nitrogen, indicating a diethylaminoethyl substitution of 0.73. This product gave clear, viscous solutions in water, 20% acetic acid, and 2% sodium hydroxide.

*Example 8*

Two parts of the sodium salt of a carboxymethyl hydroxyethyl cellulose having a hydroxyethyl substitution of 0.31 and sodium carboxymethyl substitution of 0.30 and a base weight of 200 was dissolved in 40 parts of a 15.5% aqueous solution of trimethylbenzyl ammonium hydroxide by agitating at 48° C. for about one hour. Di-n-butyl aminoethyl chloride hydrochloride (6.5 parts, which was equal to 2.85 moles per base weight) was added to the solution and the reaction mixture was agitated for 1½ hours at 45° C. At the end of this time, the product had separated in a gelatinous form. The highly swollen material was filtered, then dissolved in 20% acetic acid, and reprecipitated by pouring into a 7:3 mixture of acetone and isopropanol. The product was then separated by filtration, washed with the mixed solvent, and then with acetone and finally was dried at 50° C. in vacuo. The product was found to have a di-n-butyl aminoethyl substitution of 0.25. It was completely soluble in aqueous acids and in methanol but was insoluble in water and in aqueous alkali.

*Example 9*

Two parts of the sodium salt of a carboxymethylcellulose having a degree of substitution of 0.7 (base weight of 218) were dissolved in 53 parts of a 20% aqueous solution of trimethylbenzyl ammonium hydroxide (6.8 moles per base weight) and 6.37 parts of diethylaminoethyl chloride hydrochloride (4 moles per base weight) were added. The reaction mixture was maintained at 35°–40° C. for 2 hours with constant agitation. The product was precipitated by adding a 4:1 mixture of acetone and ethanol, separated by filtration, washed with the mixed solvent and then with hexane and finally was dried in vacuo at 60° C. The carboxymethyl diethylaminoethyl cellulose so obtained had a nitrogen content of 1.86% which corresponds to a diethylaminoethyl substitution of 0.34. It was completely soluble in dilute acids, dilute alkalies, and water giving clear viscous solutions in each case.

In accordance with this invention, dialkylaminoalkyl ethers of cellulose or partially substituted celluloses may be prepared by reacting a cellulosic compound containing etherifiable hydroxyl radicals with a dialkylaminoalkyl halide in the presence of a quaternary ammonium hydroxide. The reaction may be represented as follows:

$$\text{Cell—OH} + R_1R_2N\text{—}(CH_2)_n\text{—X} \longrightarrow$$
$$\text{Cell—O—}(CH_2)_n\text{—}NR_1R_2 + HX$$

where Cell—OH represents an etherifiable hydroxyl group of cellulose or a substituted cellulose, $R_1$ and $R_2$ are alkyl radicals, and $n$ is an integer of from 2 to 4.

Any cellulosic compound containing etherifiable hydroxyl radicals; i. e., free or unreacted hydroxyl groups, may be reacted with dialkylaminoaklyl halides in the presence of a quaternary ammonium hydroxide in accordance with this invention. Examples of such cellulosic compounds are cellulose and partially substituted celluloses such as the alkyl celluloses as, for example, methyl cellulose, ethyl cellulose, propyl cellulose, butyl cellulose, etc., hydroxyalkyl celluloses as, for example, hydroxyethyl cellulose, etc., sulfoalkyl celluloses as, for example, sulfoethyl cellulose, carboxyalkyl celluloses as, for example, carboxymethyl and carboxyethyl cellulose, mixed cellulosic derivatives such as carboxymethyl hydroxyethyl cellulose, etc.

The reaction between the cellulosic compound and the dialkylaminoalkyl halide may be carried out in the presence of any quaternary ammonium hydroxide. Particularly suitable quaternary ammonium hydroxides are the trialkyl aralkyl ammonium hydroxides such as trimethylbenzyl, triethylbenzyl ammonium hydroxides, etc., dialkyl diaralkyl quaternary ammonium hydroxides such as dimethyl dibenzyl, diethyl dibenzyl quaternary ammonium hydroxides, etc. The cellulosic compound may be dissolved or dispersed in an aqueous solution of the quaternary ammonium hydroxide by agitating a mixture of the two at room temperature or, if necessary, slightly elevated temperatures. The concentration of the aqueous solution of the quaternary ammonium hydroxide will depend upon the hydroxide utilized and the amount of solvation desired. For example, maximum solvation of cellulose in an aqueous solution of trimethylbenzyl ammonium hydroxide occurs at a normality of 2.15 and for dimethyl dibenzyl ammonium hydroxide, at 1.90. However, the dialkylaminoalkylation will proceed favorably with concentrations lower than these normalities.

The dialkylaminoalkyl halides which may be reacted with the cellulosic compound may be defined as those having the general formula

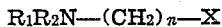

where $R_1$ and $R_2$ may be any alkyl radical such as methyl, ethyl, propyl, isopropyl, butyl, isobutyl, etc., and $R_1$ and $R_2$ may be alike or different and $n$ may be any integer of from 2 to 4; i. e., the dialkylaminoalkyl halide may be a dialkylaminoethyl, aminopropyl, or aminobutyl halide. The solubility of the product decreases as $n$ increases and, consequently, to produce acid-soluble dialkylaminoalkyl ethers of cellulose or partially substituted celluloses, $n$ should not exceed 4. In the same way, as the length of $R_1$ and $R_2$ increases, the solubility of the product decreases and accordingly they will preferably contain not more than 4 carbon atoms or a maximum of 8 carbon atoms for the two radicals. X may be any halide; i. e., chlorine, bromine, or iodine, and the dialkylaminoalkylation reagent may be used in the form of the free base or a salt thereof as, for example, the hydrohalide salts such as diethylaminoethyl chloride hydrochloride, diethylaminoethyl bromide hydrobromide, the sulfate salts, etc. As used in this specification and the claims appended hereto, the term dialkylaminoalkyl halide is meant to include both the free base and the salts thereof.

The reaction is carried out by dissolving or dispersing the cellulosic compound in the aqueous solution of the quaternary ammonium hydroxide and then treating this solution with the dialkylaminoalkyl halide. The amount of the dialkylaminoalkylation reagent added will depend upon the degree of substitution desired, reactivity of the reagent, etc. In general, at least about two molecular equivalents of the dialkylaminoalkyl halide per anhydroglucose unit are added to produce an acid-soluble product. The etherification reaction is carried out at a temperature of about 25° to about 50° C. and preferably at temperature of from about 35° to about 45° C. for about 1 to 8 hours depending upon the reactivity of the dialkylaminoalkylation reagent. Times of less than one hour may be used with certain dialkylaminoalkyl halides, but usually only a low degree of substitution is obtained under such conditions.

The dialkylaminoalkyl ether of the cellulosic compound which is obtained as the product of the homogeneous or semihomogeneous etherification reaction described above may be precipitated by the addition of a suitable organic solvent such as methanol, or some higher alcohol, or mixed solvents such as an acetone-alcohol solvent. The precipitating solvent should be one that will dissolve the organic base and excess alkylating agent but in which the dialkylaminoalkyl ether of the cellulosic compound is not soluble. After precipitation, the product may easily be separated, washed, and dried.

The dialkylaminoalkyl ethers of cellulose or partially substituted celluloses are soluble in water, aqueous alkali, and aqueous acid depending upon their degree of substitution and the length of the alkyl chains in the dialkylaminoalkyl group. For example, with longer chain alkyl groups a degree of substitution of about 0.4 will impart acid solubility to cellulose, whereas with a shorter chain alkyl a substitution of from 0.6 to 0.7 may be required. As the degree of substitution increases, so also does the solubility in water and aqueous alkali. In addition, at higher substitutions the dialkylaminoalkyl celluloses are usually soluble in such alcohols as methanol and ethanol to yield a readily gelled or thixotropic solution. In the case of partially substituted celluloses a somewhat lower degree of substitution of dialkylaminoalkyl groups may be required to impart acid solubility. A partially substituted cellulose which has good solution properties in water and alkali will require only a low dialkylaminoalkyl substitution in order for the product to be soluble in acid. However, if the partially substituted cellulose has poor water and alkali solubility then, as in the case of cellulose itself, a higher degree of substitution is necessary to impart acid solubility to the product. By carrying out the dialkylaminoalkylation reaction in accordance with this invention it is possible to obtain any desired degree of substitution.

When the dialkylaminoalkylation reaction is carried out in accordance with this invention in the presence of a quaternary ammonium hydroxide, the reaction results not only in a product which has the desired acid solubility but also by an extremely efficient reaction. Thus this invention has provided an economical and practical method of preparing the greatly desired acid-soluble nitrogen-containing cellulosic derivatives.

The dialkylaminoalkyl ethers of cellulose or partially substituted celluloses have many practical applications because of their solubility in aqueous systems which are acid, neutral, or basic. They are of value as thickening and emulsifying agents in many situations where the acid-insoluble carboxymethyl and sulfoethyl celluloses have failed. In particular, they may be used as sizes for natural and synthetic fibers, additives for synthetic detergents, media for pigment dispersions, dye paste thickeners, binders for ceramics, and in special purpose adhesives.

What I claim and desire to protect by Letters Patent is:

1. The process of preparing an acid-soluble dialkylaminoalkyl ether of a cellulosic compound containing etherifiable hydroxyl radicals wherein the product contains at least about 0.4 dialkylaminoalkyl group per glucose unit when the dialkylaminoalkyl group is the sole substituent group in the product and at least about 0.25 dialkylaminoalkyl group per glucose unit when the product contains at least one substituent group in addition to the dialkylaminoalkyl group, which process comprises reacting the cellulosic compound containing etherifiable hydroxyl radicals with at least about 2 moles per glucose unit of a dialkylaminoalkyl halide in the presence of an aqueous solution of a quaternary ammonium hydroxide at a temperature of from about 25° C. to about 50° C., said dialkylaminoalkyl halide having the formula $$R_1R_2N—(CH_2)_n—X$$

where $R_1$ and $R_2$ are alkyl radicals, $n$ is an integer of from 2 to 4, and X represents a halogen.

2. The process of preparing an acid-soluble dialkylaminoalkyl ether of cellulose containing at least about 0.4 dialkylaminoalkyl group per glucose unit, which comprises reacting cellulose with at least about 2 moles per glucose unit of a dialkylaminoalkyl halide in the presence of an aqueous solution of a quaternary ammonium hydroxide at a temperature of from about 25° C. to about 50° C., said dialkylaminoalkyl halide having the formula $$R_1R_2N—(CH_2)_n—X$$

where $R_1$ and $R_2$ are alkyl radicals, $n$ is an integer of from 2 to 4, and X represents a halogen.

3. The process of preparing an acid-soluble dialkylaminoalkyl ether of a partially substituted carboxyalkyl cellulose containing at least about 0.25 dialkylaminoalkyl group per glucose unit, which comprises reacting said carboxyalkyl cellulose with at least about 2 moles per glucose unit of a dialkylaminoalkyl halide in the presence of an aqueous solution of a quaternary ammonium hydroxide at a temperature of from about 25° C. to about 50° C., said dialkylaminoalkyl halide having the formula $$R_1R_2N—(CH_2)_n—X$$

where $R_1$ and $R_2$ are alkyl radicals, $n$ is an integer of from 2 to 4, and X represents a halogen.

4. The process of preparing an acid-soluble dialkylaminoalkyl ether of a partially substituted sulfoalkyl cellulose containing at least about 0.25 dialkylaminoalkyl group per glucose unit, which comprises reacting said sulfoalkyl cellulose with at least about 2 moles per glucose unit of a dialkylaminoalkyl halide in the presence of an aqueous solution of a quaternary ammonium hydroxide at a temperature of from about 25° C. to about 50° C., said dialkylaminoalkyl halide having the formula $$R_1R_2N—(CH_2)_n—X$$

where $R_1$ and $R_2$ are alkyl radicals, $n$ is an integer of from 2 to 4, and X represents a halogen.

5. The process of preparing an acid-soluble dialkylaminoethyl ether of cellulose containing at least about 0.4 dialkylaminoethyl group per glucose unit, which comprises reacting cellulose with at least about 2 moles per glucose unit of a dialkylaminoethyl halide in the presence of an aqueous solution of a quaternary ammonium hydroxide at a temperature of from about 25° C. to about 50° C.

6. The process of preparing an acid-soluble dialkylaminoethyl ether of a partially substituted carboxyalkyl cellulose containing at least about 0.25 dialkylaminoethyl group per glucose unit, which comprises reacting said carboxyalkyl cellulose with at least about 2 moles per glucose unit of a dialkylaminoethyl halide in the presence of an aqueous solution of a quaternary ammonium hydroxide at a temperature of from about 25° C. to about 50° C.

7. The process of preparing an acid-soluble dialkylaminoethyl ether of a partially substituted sulfoalkyl cellulose containing at least about 0.25 dialkylaminoethyl group per glucose unit, which comprises reacting said sulfoalkyl cellulose with at least about 2 moles per glucose unit of a dialkylaminoethyl halide in the presence of an aqueous solution of a quaternary ammonium hydroxide at a temperature of from about 25° C. to about 50° C.

8. The process of preparing an acid-soluble diethylaminoethyl ether of cellulose containing at least about 0.4 diethylaminoethyl group per glucose unit, which comprises reacting cellulose with at least about 2 moles per glucose unit of a diethylaminoethyl halide in the presence of an aqueous solution of a quaternary ammonium hydroxide at a temperature of from about 25° C. to about 50° C.

9. The process of preparing an acid-soluble diethylaminoethyl ether of partially substituted carboxymethyl cellulose containing at least about 0.25 diethylaminoethyl group per glucose unit, which comprises reacting said carboxymethyl cellulose with at least about 2 moles per glucose unit of a diethylaminoethyl halide in the presence of an aqueous solution of a quaternary ammonium hydroxide at a temperature of from about 25° C. to about 50° C.

10. The process of preparing an acid-soluble diethylaminoethyl ether of a partially substituted sulfoethyl cellulose containing at least about 0.25 diethylaminoethyl group per glucose unit, which comprises reacting said sulfoethyl cellulose with at least about 2 moles per glucose unit of a diethylaminoethyl halide in the presence of an aqueous solution of a quaternary ammonium hydroxide at a temperature of from about 25° C. to about 50° C.

11. The process of preparing an acid-soluble diethylaminoethyl ether of a partially substituted carboxyethyl cellulose containing at least about 0.25 diethylaminoethyl group per glucose unit, which comprises reacting said carboxyethyl cellulose with at least about 2 moles per glucose unit of a diethylaminoethyl halide in the presence of an aqueous solution of a quaternary ammonium hydroxide at a temperature of from about 25° C. to about 50° C.

12. The process of preparing an acid-soluble diethylaminoethyl ether of a partially substituted hydroxyethyl cellulose containing at least about 0.25 diethylaminoethyl group per glucose unit, which comprises reacting said hydroxyethyl cellulose with at least about 2 moles per glucose unit of a diethylaminoethyl halide in the presence of an aqueous solution of a quaternary ammonium hydroxide at a temperature of from about 25° C. to about 50° C.

VERNON R. GRASSIE.

REFERENCES CITED

The following references are of record in the file of this patent:

UNITED STATES PATENTS

| Number | Name | Date |
| --- | --- | --- |
| 1,777,970 | Hartmann | Oct. 7, 1930 |
| 2,084,125 | Bock et al. | June 15, 1937 |
| 2,087,549 | Powers et al. | July 20, 1937 |
| 2,136,296 | Hardy | Nov. 8, 1938 |
| 2,163,723 | Whitehead | June 27, 1939 |
| 2,181,264 | Dreyfus | Nov. 28, 1939 |
| 2,184,564 | Oxley et al. | Dec. 26, 1939 |
| 2,519,249 | Hutchinson | Aug. 15, 1950 |
| 2,539,417 | Grassie | Jan. 30, 1951 |